United States Patent
Dean et al.

(10) Patent No.: US 7,094,861 B2
(45) Date of Patent: Aug. 22, 2006

(54) THERMOPLASTIC COMPOSITION CONTAINING POLYMERIC ANTI-STATIC SALT, METHOD OF MAKING, AND USE THEREOF

(75) Inventors: Jennifer Dean, Eindhoven (NL); Dibakar Dhara, Bangalore (IN); Theodorus Lambertus Hoeks, Bergon op Zoom (NL); Chiel Leenders, Fijnaart (NL); Anandrao S. Patil, Pune (IN); Bhimrao D. Sarwade, Pune (IN); Prakash P. Wadgaonkar, Pune (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/815,257

(22) Filed: Mar. 31, 2004

(65) Prior Publication Data

US 2005/0140047 A1    Jun. 30, 2005

Related U.S. Application Data

(60) Provisional application No. 60/533,173, filed on Dec. 30, 2003.

(51) Int. Cl.
  *C08G 64/00* (2006.01)
(52) U.S. Cl. .................. 528/196; 252/500; 264/176.1; 264/219; 428/412; 524/136; 528/198
(58) Field of Classification Search ............... 252/500; 264/176.1, 219; 428/412; 524/136; 528/196
See application file for complete search history.

(56) References Cited

U.S. PATENT DOCUMENTS

| 3,169,121 | A |   | 2/1965  | Goldberg |
|-----------|---|---|---------|----------|
| 3,635,895 | A |   | 1/1972  | Kramer   |
| 4,001,184 | A |   | 1/1977  | Scott    |
| 4,081,383 | A |   | 3/1978  | Warburton, Jr. et al. |
| 4,450,249 | A |   | 5/1984  | Schmidt et al. |
| 4,487,896 | A |   | 12/1984 | Mark et al. |
| 4,900,544 | A |   | 2/1990  | Ritter |
| 4,914,150 | A |   | 4/1990  | Prier |
| 4,943,380 | A |   | 7/1990  | Sugiura et al. |
| 5,071,884 | A | * | 12/1991 | Malone ....................... 521/79 |
| 5,187,214 | A |   | 2/1993  | Govindan |
| 5,372,884 | A | * | 12/1994 | Abe et al. ................. 428/32.36 |
| 6,090,907 | A |   | 7/2000  | Saito et al. |
| 6,194,497 | B1 |  | 2/2001  | Willems et al. |
| 6,407,158 | B1 |  | 6/2002  | Kim et al. |
| 6,740,413 | B1 | * | 5/2004 | Klun et al. .................. 428/421 |
| 2003/0065071 | A1 | * | 4/2003 | Scholten ..................... 524/136 |

FOREIGN PATENT DOCUMENTS

| EP | 0 897 950 A2 | 2/1999 |
| EP | 0 897 950 A3 | 2/1999 |
| EP | 897950 | 2/1999 |
| JP | 1-2660537 | * 10/1989 |
| JP | 2608096 B2 | 5/1997 |
| JP | 9279010 | 10/1997 |
| WO | WO01/25326 | 4/2001 |
| WO | WO01/49925 | 7/2001 |

OTHER PUBLICATIONS

Yaun et al., "Surface Enrichment of Polu(triflurovinyl ether)s in Polystryrene Blends", Macromolecules 2000, 33, pp. 4926-4931.
Torstensson et al., "Monomeric Surfactants for Surface Modification of Polymers", Macromolecules 1990,23, pp. 126-132.
Walton et al., "Creation of Stable Poly(ethylene oxide) Surfaces on Poly(methyl methacrylate) Using Blends of Branched and Linear Polymers", Macromolecules 1997,30, pp. 6947-6956.
Anastasiadis et al., "Smart Polymer Surfaces", Macromolecules 2003,36, pp. 1994-1999.
Xu et al., "Synthesis of Polymerizable Anionic Surfactants and Their Emulsion Copolymerization with Styrene", Langmuir 2001, 17, pp. 6077-6085.
Bajaj et al. "Antistatic and Hydrophilic Synthetic Fibers: A Critique", J.M.S.-Rev. Macromol. Chem. Phy. 2000, C40(2&3), pp. 105-138.
International Search Report; International Application No: PCT/US2004/042873;International Filing Date: Dec. 17, 2004; Applicant's File Reference No: 08CL139361; Date of Mailing: Mar. 31, 2005; 6 pages.
JP2003176405. Publication Date Jun. 24, 2003. "Antistatic Polycarbonate Resin Composition" Machine Translation and Abstract.
International Search Report for PCT/US2004/042715. Mailed Apr. 14, 2005.

* cited by examiner

*Primary Examiner*—Terressa Boykin

(57) ABSTRACT

Compositions exhibiting water resistant anti-static properties prepared from a thermoplastic polymer and a polymeric anti-static salt is disclosed.

19 Claims, No Drawings

THERMOPLASTIC COMPOSITION CONTAINING POLYMERIC ANTI-STATIC SALT, METHOD OF MAKING, AND USE THEREOF

CROSS-REFERENCE TO RELATED APPLICATIONS

This application claims the benefit of U.S. Provisional Application No. 60/533,173 filed Dec. 30, 2003.

FIELD OF THE INVENTION

This invention is related to thermoplastic compositions containing a polymeric anti-static salt, particularly transparent compositions containing a polymeric anti-static salt.

BACKGROUND OF THE INVENTION

Most polymers or blends of polymers are non-conductive. As such, a static charge build-up may result during processing and use of the polymer. The charged polymer molded parts can attract dust, which are small particles, and can thus interfere with a smooth surface appearance. The attracted particles to the surface of a molded article may also cause a decrease in the transparency of the article. In addition, the electrostatic charge can be a serious obstacle in the production process of such polymers.

Anti-static agents are small molecule materials which can be added to polymers to reduce their tendency to acquire an electrostatic charge, or when a charge is present, these anti-static agents promote the dissipation of such a charge. The anti-static agents are usually hydrophilic or ionic in nature. When present on the surface of polymeric materials, they facilitate the transfer of electrons and thus eliminate the build up of a static charge. Anti-static agents have been applied in two ways. One method uses external anti-static agents that are applied by spraying the surface or dipping of the polymeric material. The second method uses internal anti-static agents, which are added to the polymer before processing. It is necessary for anti-static agents applied in this manner to be thermally stable and able to migrate to the surface during processing.

Since there are many anti-static agents having surface-active additives as their main constituent, appropriate ones may be selected therefrom according to the situation. Surface activity can involve both migration of the agent to the surface of the article during molding as well as their ability to function to eliminate the build up of a static charge at the article surface. When used as an internally-applied anti-static agent, however, anionic surface active additives are difficult to handle because they are inferior in compatibility and uniform dispersibility and tend to decompose or deteriorate when heated. Cationic surface-active additives containing qualernary nitrogen in their molecules and amphoteric surface-active additives, on the other hand, can be used only in limited situations because they are extremely poor in heat resistance, although their anti-static characteristics are good. As for non-ionic surface-active additives, they are more compatible with polymeric materials, but tend to be weak in anti-static characteristics and their effects disappear with time at normal or high temperatures. Moreover, because of the limited thermal stability of these non-ionic surface-active anti-static agents, their use with engineering thermoplastic resins, such as aromatic polycarbonates, is also limited due to the temperatures at which such resins are processed. Thus, these types of surface-active additives adversely affect the optical properties of aromatic polycarbonates.

Although metal salts of organic sulfonic acids have been reported, especially as internally applied anti-static agents for polycarbonates and polyester resins which are molded at high temperatures, they are not sufficient in compatibility with resins, nor are they heat resistant. An adverse consequence of insufficient compatibility is that transparency characteristics of certain polymeric materials are lost with such anti-static agents. Also onium salts (such as phosphonium and ammonium salts of organic sulfonic acids) are known, particularly ammonium and phosphonium salts of perfluorinated alkyl sulfonates.

While there are known anti-static agents presently available, there remains a need for further improvements to provide anti-static agents that provide a thermoplastic composition with good anti-static properties, and good retention of the anti-static properties over time and/or after exposure to water. Preferably, such improvements are provided without detrimentally affecting the optical properties of the thermoplastic, including transparency.

SUMMARY OF THE INVENTION

In one embodiment, a composition comprises a thermoplastic polymer and a polymeric anti-static salt.

In another embodiment, a composition comprises an aromatic thermoplastic polymer and a polymeric anti-static salt In yet another embodiment, a composition comprises a polycarbonate, an aromatic polycarbonate, a (co)polyestercarbonate, an aromatic (co)polyestercarbonate, blends thereof, or a combination comprising at least one of the foregoing polymers; and about 0.1 to about 10 weight percent of a polymeric anti-static salt based on the total weight of the composition, wherein the polymeric anti-static salt comprises a polymeric anionic component derived from poly(meth)acrylic acid, polyacrylic acid, poly(ethyl)acrylic acid, poly(maleic acid), poly(vinyl sulfonic acid), or poly (4-styrene sulfonic acid); and a phosphonium or ammonium cationic component.

In yet another embodiment, a method of making a transparent, anti-static article comprises blending a thermoplastic polymer and a polymeric anti-static salt to form a blend; and molding the blend to form an article.

In another embodiment, a method of preparing a polymeric anti-static salt comprises polymerizing ionic monomers, wherein the ionic monomer comprises reactive functionality and a salt moiety, wherein the reactive functionality is an epoxy group, a vinyl group, an acrylate group, an (alkyl)acrylate group, an allylic group, a styrenic group, an acrylamide group, an (alkyl)acrylamide group, a crotyl group or a combination comprising at least one of the foregoing groups; and wherein the salt moiety is a carboxylate salt or a sulfonate salt comprising a phosphonium or ammonium cationic component according to the structure:

wherein Q is nitrogen or phosphorus; and $R^1$, $R^2$, $R^3$, and $R^4$ are each independently a $C_1$–$C_{20}$ alkyl, a ($C_6$–$C_{12}$ aryl) $C_1$–$C_{10}$ alkyl group, a ($C_1$–$C_{10}$ alkyl)$C_6$–$C_{12}$ aryl group, or a $C_6$–$C_{12}$ aryl group.

In still yet another embodiment, a polymeric anti-static salt comprises repeating units according to the structure:

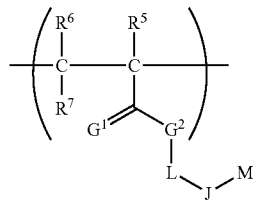

wherein $R^5$ is H or ($C_1$–$C_6$)alkyl; $R^6$ is H or ($C_1$–$C_6$)alkyl; $R^7$ is H or ($C_1$–$C_6$)alkyl; $G^1$ is O or S; $G^2$ is O, S or $NR^8$, wherein $R^8$ is H or ($C_1$–$C_6$)alkyl; L is one or more units of ethylene glycol, divalent ($C_1$–$C_{20}$) alkyl, divalent ($C_6$–$C_{12}$) aryl, divalent ($C_1$–$C_{20}$ alkoxy) $C_1$–$C_{20}$ alkyl , divalent ($C_1$–$C_{10}$ alkyl)$C_6$–$C_{12}$ aryl, divalent ($C_6$–$C_{12}$ aryl)$C_1$–$C_{10}$ alkyl, divalent ($C_1$–$C_{10}$ alkoxy)$C_6$–$C_{12}$ aryl, or divalent ($C_6$–$C_{12}$ aryloxy)$C_1$–$C_{10}$ alkyl; J is a carboxylate or a sulfonate group; and M is an ammonium or phosphonium cationic component according to the structure:

wherein Q is nitrogen or phosphorus; and $R^1$, $R^2$, $R^3$, and $R^4$ are each independently a $C_1$–$C_{20}$ alkyl, a ($C_6$–$C_{12}$ aryl) $C_1$–$C_{10}$ alkyl group, a ($C_1$–$C_{10}$ alkyl)$C_6$–$C_{12}$ aryl group, or a $C_6$–$C_{12}$ aryl group.

DETAILED DESCRIPTION OF THE INVENTION

Provided herein are transparent, water resistant anti-static compositions comprising a thermoplastic polymer and a polymeric anti-static salt. Such a composition exhibits permanent antistatic properties which are retained after surface washing. Not wishing to be bound by theory, it is believed the polymeric anti-static salt is insoluble in water due to its high molecular weight thereby allowing for the retention of the antistatic property even after washing.

Also disclosed herein is a method for imparting permanent antistatic properties to an article prepared from a thermoplastic polymer comprising adding to the thermoplastic polymer an effective amount of a polymeric anti-static salt.

In one embodiment, a method of preparing a polymeric anti-static salt comprises polymerizing ionic monomers, wherein the ionic monomers comprise a reactive functionality and a salt functionality.

In another embodiment, a polymeric anti-static salt comprises the reaction product of ionic monomers, wherein the ionic monomers comprise a reactive functionality and a salt functionality.

All ranges disclosed herein are inclusive and combinable (e.g., ranges of "up to about 25 wt %, with about 5 wt % to about 20 wt % desired," is inclusive of the endpoints and all intermediate values of the ranges of "about 5 wt % to about 25 wt %," etc.).

By the term "halo" or "halogen" is meant, fluorine, chlorine, bromine, and iodine.

By the term "haloalkyl" is meant an alkyl group comprising one or more halogen atoms substituting available hydrogen atoms up to perhalogenated substitution.

As used herein, "(meth)acrylate" is inclusive of both acrylate and methacrylate functionality.

As used herein, the term monomer is inclusive of both monomer and oligomer unless otherwise stated.

The polymeric anti-static salt used herein may be any suitable polymeric salt that, when blended with a thermoplastic polymer, provides a transparent material exhibiting anti-static properties. The polymeric anti-static salt generally comprises a polymeric anionic component and a cationic component, preferably a non-polymeric cationic component. Non-limiting examples of suitable polymeric anionic components include poly(acids) having a polymer backbone comprising a plurality of pendent acidic groups capable of forming an ionic bond with the cationic component. Suitable acidic groups include, for example, carboxylic acid and sulfonic acid. The backbone of the polymeric anionic component may be a carbon backbone containing substitution in addition to the acidic groups, including for example linear, branched or cyclic $C_1$–$C_{10}$ alkyl groups, $C_6$–$C_{12}$ aryl groups, ($C_1$–$C_{10}$ alkyl)$C_6$–$C_{12}$ aryl groups, and/or ($C_6$–$C_{12}$ aryl)$C_1$–$C_{10}$ alkyl groups, wherein each alkyl or aryl group may be unsubstituted or substituted with 1, 2, or 3 substitutents independently chosen from hydroxyl, halogen, $C_1$–$C_6$ alkyl, $C_1$–$C_6$ haloalkyl, $C_1$–$C_6$ alkoxy, and the like.

Non-limiting examples of the polymeric anionic component includes those derived from poly(meth)acrylic acid, polyacrylic acid, poly(ethyl)acrylic acid, poly(maleic acid), poly(vinyl sulfonic acid), poly(4-styrene sulfonic acid), and the like.

The number average molecular weight (Mn) of the polymeric anionic component may be about 500 to about 20,000, preferably about 1000 to about 10,000, more preferably about 2000 to about 8,000, and yet more preferably about 4000 to about 7000.

The polymeric anti-static salt further comprises a cationic component. Suitable cationic components include phosphonium or ammonium cations. A preferred cation component is a compound according to the following structure:

wherein Q is nitrogen or phosphorus; $R^1$, $R^2$, $R^3$, and $R^4$ are each independently a $C_1$–$C_{20}$ alkyl, a ($C_6$–$C_{12}$ aryl)$C_1$–$C_{10}$ alkyl group, a ($C_1$–$C_{10}$ alkyl)$C_6$–$C_{12}$ aryl group, or a $C_6$–$C_{12}$ aryl group. Suitable $C_1$–$C_{20}$ alkyl groups include, for example, methyl, ethyl, n-propyl, iso-propyl, n-butyl, t-butyl, n-pentyl, n-hexyl, n-heptyl, n-octyl, lauryl, stearyl, and the like. Non-limiting examples of phosphonium or ammonium cations include, tetramethyl phosphonium, tetraethyl phosphonium, tetrapropyl phosphonium, tetrabutyl phosphonium, triethylmethyl phosphonium, tributylmethyl phosphonium, tributylethyl phosphonium, trioctylmethyl phosphonium, trimethylbutyl phosphonium trimethyloctyl phosphonium, trimethyllauryl phosphonium, trimethylstearyl phosphonium, triethyloctyl phosphonium, or their ammonium analogs, and the like; and aromatic phosphoniums such as tetraphenyl phosphonium, triphenylmethyl phosphonium, triphenylbenzyl phosphonium, tributylbenzyl phosphonium, or their ammonium analogs, and the like.

The polymeric anti-static salt may be prepared according to several synthetic routes. For instance, a poly(acid) or its corresponding salt, such as poly(methacrylic acid) sodium salt may be combined with a phosphonium or ammonium salt of structure (I), such as tetrabutylphosphonium bromide, to form the desired polymeric anti-static salt using known techniques. Alternatively, an ionic monomer can be polymerized to form the polymeric anti-static salt.

In one embodiment, the polymeric anti-static salt may be prepared by polymerizing an ionic monomer that comprises both a reactive functionality and a salt moiety capable of imparting anti-static properties. Through polymerization of the ionic monomers via the reactive functionality, a polymeric anti-static salt is prepared comprising a polymeric backbone based on the reactive groups and salt moieties pendent from the backbone. Suitable reactive functionality may include, for example, epoxy groups; ethylenic unsaturation such as vinyl groups, acrylate groups, ($C_1$–$C_6$ alkyl) acrylate groups, allylic groups, styrenic groups, acrylamide groups, ($C_1$–$C_6$ alkyl)acrylamide groups, crotyl groups, and the like; and combinations of the foregoing reactive functionality. Preferred reactive functionality includes (meth) acrylate groups.

Salt moieties of the ionic monomer may include, for example, sulfonate salts, including ammonium sulfonate salts, phosphonium sulfonate salts, and the like; carboxylate salts, including ammonium carboxylate salts, phosphonium carboxylate salts, and the like; and imidazolium salts, and the like. Suitable ammonium and phosphonium cations include those described herein.

A linking group may be present in the ionic monomer linking the salt moiety to the reactive functionality. Any suitable linking group may be used including divalent, substituted or unsubstituted alkyl, aryl, alkaryl, arylalkyl, and the like; ether, including one or more ethylene glycol units, and the like; ester; ketone; amide; urea; carbonate; carbamate; and the like. For example, a styrene monomer having sulfonate salt substitution on the phenyl ring would have a phenyl linking group linking the reactive functionality (ethylenic unsaturation) to the salt. In another example, 4-(6-methacryloxy hexyl)oxy benzene tetrabutylphosphonium sulfonate, the synthesis of which is described herein below, contains a hexyloxybenzene linking group.

In an exemplary embodiment, the ionic monomer has the general formula: (RF—)$_m$L(—X)$_n$, wherein RF is the reactive functionality, X is the salt moiety, L is a linking group; m is an integer of 1, 2, or 3; and n is an integer of 1, 2, or 3. In one embodiment, m is 1 and n is 1. Preferred reactive functionality (RF) includes the reactive functionality described above. Preferred salt moieties (X) include those described herein, including carboxylate or sulfonate salts wherein the cationic portion may be an ammonium or phosphonium cation. Preferred linking groups (L) include one or more ethylene glycol units, divalent ($C_1$–$C_{20}$) alkyl groups, divalent ($C_6$–$C_{12}$) aryl groups; divalent ($C_1$–$C_{10}$ alkyl)$C_6$–$C_{12}$ aryl groups wherein the RF is covalently bonded to the alkyl portion and X is bonded to the aryl portion; divalent ($C_6$–$C_{12}$ aryl)$C_1$–$C_{10}$ alkyl groups; divalent ($C_1$–$C_{10}$ alkoxy)$C_6$–$C_{12}$ aryl groups; divalent ($C_6$–$C_{12}$ aryloxy)$C_1$–$C_{10}$ alkyl groups; and the like.

Anti-static salts that are homopolymers prepared from a single ionic monomer type are preferred. Also contemplated herein are copolymers prepared by reacting one type of ionic monomer with one or more additional different ionic monomers and/or non-ionic monomers. Non-ionic monomers, as used herein, are monomers lacking a salt functionality while at the same time having at least one reactive functionality as described herein. By adjusting the type and amount of ionic monomers, additional ionic monomers, and/or non-ionic monomers, it is possible to tailor the properties of the resulting polymeric anti-static salt for a particular need. Exemplary properties that can be adjusted include hydrophobicity, hydrophilicity, molecular weight, thermal stability, compatibility, transparency, and the like.

Optionally, a polymerization initiator may be used in the polymerization process to prepare the polymeric anti-static salt from ionic monomers. One of ordinary skill in the art may determine the most suitable polymerization initiator to use based upon the reactive functionality of the ionic monomer. Cationic polymerization initiators suitable for polymerizing epoxy functionality include, for example, aromatic onium salts such as iodonium, sulfonium, bromonium, or selenonium salts, and the like, including those onium salt initiators described in U.S. Pat. No. 4,250,053 to Smith.

The polymerization initiator may include peroxy-based free radical initiators that promote polymerization under thermal activation. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, trimethylsilylphenyltriphenylsilyl peroxide, and the like, and combinations comprising at least one of the foregoing polymerization initiators.

Also suitable are azo-type free radical initiators, for example, 2,2'-azobisisobutyronitrile (AIBN), 2,2'-azobis(2,4 dimethylpentane nitrile), 2,2'-azobis(2-methylbutane nitrile), 1,1'-azo(cyclohexane carbonitrile), 4,4'-azobis(4-cyanopentanoic) acid, and the like.

Other polymerization initiators include photoinitiators that promote polymerization of the reactive functionality upon exposure to actinic radiation. Such photoinitiators include phosphine oxide photoinitiators, ketone-based photoinitiators, such as hydroxy- and alkoxyalkyl phenyl ketones, thioalkylphenyl morpholinoalkyl ketones, benzoin ether photoinitiators, and the like, and combinations comprising at least one of the foregoing polymerization initiators.

The polymerization initiator may be used in an amount of about 0.1 to about 10 weight percent, preferably about 1 to about 8 weight percent, and yet more preferably about 2 to about 5 weight percent based upon the total weight of the initiator and ionic monomer.

In one embodiment, the polymeric anti-static salt comprises repeating units according to the structure (II):

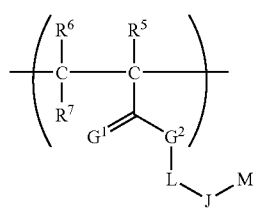
(II)

wherein $R^5$ is H or $(C_1-C_6)$alkyl; $R^6$ is H or $(C_1-C_6)$alkyl; $R^7$ is H or $(C_1-C_6)$alkyl; $G^1$ is O or S; $G^2$ is O, S or $NR^8$, wherein $R^8$ is H or $(C_1-C_6)$alkyl; L is one or more units of ethylene glycol, divalent $(C_1-C_{20})$ alkyl, divalent $(C_6-C_{12})$ aryl, divalent $(C_1-C_{20}$alkoxy) $C_1-C_{20}$ alkyl, divalent $(C_1-C_{10}$ alkyl)$C_6-C_{12}$ aryl, divalent $(C_6-C_{12}$ aryl)$C_1-C_{10}$ alkyl, divalent $(C_1-C_{10}$ alkoxy)$C_6-C_{12}$ aryl, or divalent $(C_6-C_{12}$ aryloxy)$C_1-C_{10}$ alkyl; J is a carboxylate or a sulfonate group; and M is an ammonium or phosphonium cationic component according to the structure (III):

(III)

wherein Q is nitrogen or phosphorus; and $R^1$, $R^2$, $R^3$, and $R^4$ are each independently a $C_1-C_{20}$ alkyl, a $(C_6-C_{12}$ aryl) $C_1-C_{10}$ alkyl group, a $(C_1-C_{10}$ alkyl)$C_6-C_{12}$ aryl group, or a $C_6-C_{12}$ aryl group.

In another embodiment, the polymeric anti-static salt comprises repeating units according to the structure (II) wherein $R^5$ is H or methyl, $R^6$ and $R^7$ are H, and $G^1$ and $G^2$ are O. In yet another embodiment, the polymeric anti-static salt comprises repeating units according to the structure (II) wherein $R^5$ is H or methyl, $R^6$ and $R^7$ are H, $G^1$ and $G^2$ are O; L is a divalent $(C_1-C_{10}$ alkoxy)$C_6-C_{12}$ aryl; J is a sulfonate group; and M is a phosphonium cationic component.

The polymeric anti-static salt is present in the composition in amounts of about 0.1 to about 10 weight percent, preferably about 0.5 to about 8 weight percent, more preferably about 1 to about 5 weight percent, and still more preferably about 2 to about 3 weight percent based on the total weight of the composition.

Suitable thermoplastic polymers that may be combined with the polymeric anti-static salt include, for example, aromatic thermoplastic polymers, polycarbonate, polyester, polyphenylene ether, polyphenylene ether/styrene blend, polyamide, polyketone, acrylonitrile-butadiene-styrene copolymer, blends thereof, or a combination comprising at least one of the foregoing polymers.

Preferably the thermoplastic polymer is polycarbonate, including aromatic polycarbonate, a polyester, a (co)polyester carbonate, copolymers of aromatic polycarbonates, or blends thereof including blends with other thermoplastic polymers.

Polycarbonate includes compositions having structural units of the formula (IV):

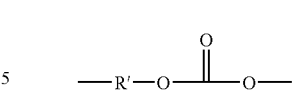
(IV)

in which greater than or equal to about 60 percent of the total number of R' groups are aromatic organic radicals and the balance thereof are aliphatic or alicyclic radicals. Preferably, R' is an aromatic organic radical and, more preferably, a radical of the formula (V):

(V)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. The bridging radical $Y^1$ can be a hydrocarbon group or a saturated hydrocarbon group such as methylene, cyclohexylidene or isopropylidene. In another embodiment, zero atoms separate $A^1$ from $A^2$, instead a covalent bond links $A^1$ to $A^2$.

Polycarbonates, in general, can be manufactured by known processes, including interfacial reaction and melt polymerization. For example, polycarbonates can be produced by the interfacial reaction of dihydroxy compounds in which only one atom separates $A^1$ and $A^2$. As used herein, the term "dihydroxy compound" includes, for example, bisphenol compounds having general formula (VI) as follows:

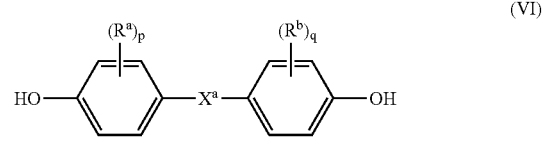
(VI)

wherein $R^a$ and $R^b$ each independently represent hydrogen, a halogen atom, preferably bromine, or a monovalent hydrocarbon group; p and q are each independently integers from 0 to 4; and $X^a$ represents one of the groups of formula (VII):

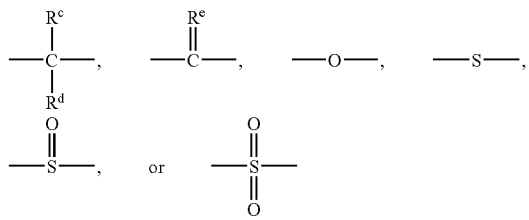
(VII)

wherein $R^c$ and $R^d$ each independently represent a hydrogen atom or a monovalent linear or cyclic hydrocarbon group, and $R^e$ is a divalent hydrocarbon group, oxygen, or sulfur.

Examples of the types of bisphenol compounds that may be represented by formula (VII) include the bis(hydroxyaryl)alkane series such as, 1,1-bis(4-hydroxyphenyl)methane; 1,1-bis(4-hydroxyphenyl)ethane, 2,2-bis(4-hydroxyphenyl) propane (or bisphenol A); 2,2-bis(3,5-dibromo-4-hydroxyphenyl)propane; 2,2-bis(3,5-dimethyl-4-hydroxyphenyl) propane; 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl) phenylmethane; 2,2-bis(4-hydroxy-1-methylphenyl)propane; 1,1-bis(4-hydroxy-t-butylphenyl)propane; 2,2-bis(4-hydroxy-3-bromophenyl)propane; 1,1-bis(4-hydroxyphenyl)decane; 4,4-dihydroxydiphenyl ether; 4,4-thiodiphenol; 4,4-dihydroxy-3,3-dichlorodiphenyl ether; 4,4-dihydroxy-2,5-dihydroxydiphenyl ether; or the like; bis (hydroxyaryl)cycloalkane series such as, 1,1-bis(4-hydroxyphenyl)cyclopentane; 1,1-bis(4-hydroxyphenyl)cyclohexane; 1,1-bis(3,5-dimethyl-4-hydroxyphenyl)cyclohexane; 1,1-bis(4-hydroxyphenyl)cyclododecane; 1,1-bis(3,5-dimethyl-4-hydroxyphenyl)cyclododecane; 1,1-bis -(4-hydroxyphenyl)-3,3,5-trimethylcyclohexane; or the like, or combinations comprising at least one of the foregoing bisphenol compounds.

Other examples of bisphenol compounds that may be represented by formula (VI) include those where $X^a$ is —O—, —S—, —S(O)—, or —S(O)$_2$—, such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other dihydroxy compounds that may be utilized in the polycondensation of polycarbonate are represented by the formula (VIII):

wherein, $R^f$, is a halogen atom, a hydrocarbon group having 1 to 15 carbon atoms, or a halogen substituted hydrocarbon group; n is a value from 0 to 4. The halogen is preferably bromine. When n is at least 2, $R^f$ may be the same or different. Examples of compounds that may be represented by the formula (VIII), are resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones, such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing compounds.

Bisphenol compounds such as 2,2,2',2'-tetrahydro-3,3,3',3'-tetramethyl-1, 1'-spirobi-[IH-indene]-6,6'-diol represented by the following formula (IX) may also be used as the dihydroxy compound:

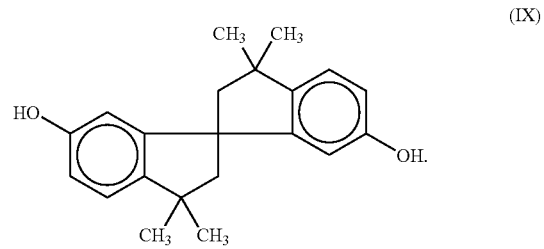

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

Branched polycarbonate, as well as blends of linear polycarbonate and a branched polycarbonate may also be used. The branched polycarbonate may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate. Branching agents and procedures for making branched polycarbonates are described in U.S. Pat. Nos. 3,635,895 and 4,001,184.

All types of polycarbonate end groups are contemplated as being useful in the polycarbonate composition. Some examples of common polycarbonate end groups are phenol, p-cumylphenol (PCP) and t-butylphenol.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, diphenyl carbonate, diethyl carbonate, dimethyl carbonate, dibutyl carbonate, dicyclohexyl carbonate, bis(o-methoxyphenyl) carbonate (bismethylsalicylate carbonate, BMSC) or the like, or combinations comprising at least one of the foregoing carbonic acid diesters. Preferred carbonic acid diesters are diphenyl carbonate and BMSC.

Also suitable are (co)polyester carbonates, also known as (co)polyester-polycarbonates or polyestercarbonates, that is, resins which contain, in addition to recurring polycarbonate chain units of the formula (X):

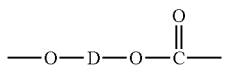

wherein D is a divalent radical of a dihydroxy compound employed in the polymerization reaction, the dihydroxy-compound as described previously; repeating or recurring carboxylate units, for example of the formula (XI):

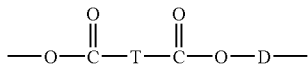

wherein D is as defined above and T is an aromatic radical such as phenylene, naphthylene, biphenylene, substituted phenylene and the like; a divalent aliphatic-aromatic hydrocarbon radical such as an alkaryl or alkaryl radical; or two or more aromatic groups connected through such aromatic linkages which are known in the art.

The copolyester-polycarbonate resins are also prepared by interfacial polymerization technique, well known to those skilled in the art (see, for example, U.S. Pat. Nos. 3,169,121 and 4,487,896).

Examples of dicarboxylic acids include isophthalic acid, terephthalic acid and α, ω aliphatic di-acids with 6–18 carbon atoms. Preferred (co)polyestercarbonates are those of isophthalic, terephthalic acid and resorcinol with or without BPA. In general, any dicarboxylic acid used in the preparation of linear polyesters may be utilized in the preparation of the polyestercarbonate resins. Generally, the dicarboxylic acids which may be utilized includes aliphatic dicarboxylic acids, aromatic dicarboxylic acids, and aliphatic aromatic dicarboxylic acids. These acids are well known and are disclosed, for example, in U.S. Pat. No. 3,169,121. Mixtures of dicarboxylic acids may be employed. Preferred as aromatic dicarboxylic acids are isophthalic acid, terephthalic acids, and mixtures thereof. A particularly useful difinctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of the acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

Blends of PC with other compatible polymers may also be used in the present compositions. Examples of such polymers include polybutylene terephtalate and butadiene styrene rubbers like ABS or MBS rubber. The ratio of the other compatible polymers to PC may be up to 50:50, or greater.

The thermoplastic composition may also comprise various optional components, including UV absorbing agents, phosphorous type stabilizers as oxidation inhibitors, hindered phenol type oxidation inhibitors, epoxy type stabilizers and sulphur type stabilizers, etc.

Any ultraviolet absorbing agent customarily used in resin compositions may be used as the above mentioned ultraviolet absorbing agent. For example, benzotriazole type ultraviolet absorbing agents, benzophenone type ultraviolet absorbing agents or salicylate type ultraviolet absorbing agents, etc., may be used. Examples of benzotriazole type ultraviolet absorbing agents include 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-amylbutylphenyl)benzotriazole, 2-(2'-hydroxy-3'-dodecyl-5'-methylphenyl)benzotriazole, 2-(2'-hydroxy-3',5'-dicumylphenyl)benzotriazole and 2,2'-methylenebis[4-(1,1,3,3-tetramethylbutyl)-6-(2H-benzotriazol-2-yl)phenol], etc. For example, a benzotriazole type ultraviolet absorbing agent is marketed by American Cyanamid Co. as UV5411. Furthermore, a benzophenone type ultraviolet absorbing agent is marketed by American Cyanamid Co. as UV531. Examples of salicylate type ultraviolet absorbing agents include phenyl salicylate, p-t-butylphenyl salicylate and p-octylphenyl salicylate, etc.

Examples of phosphorous type stabilizers comprise triphenyl phosphite, diphenylnonyl phosphite, tris(2,4-di-t-butylphenyl) phosphite, trisnonylphenyl phosphite, diphenylisooctyl phosphite, 2,2'-methylenebis (4,6-di-t-butylphenyl) octyl phosphite, diphenylisodecyl phosphite, diphenylmono (tridecyl) phosphite, 2,2'-ethylidenebis(4,6-di-t-butylphenol) fluorophosphite, phenyldiisodecyl phosphite, phenyldi(tridecyl) phosphite, tris(2-ethylhexyl) phosphite, tris(isodecyl) phosphite, tris(tridecyl) phosphite, dibutyl hydrogenphosphite, trilauryl trithiophosphite, tetrakis(2,4-di-t-butylphenyl)4,4'-biphenylene diphosphite, 4,4'-isopropylidenediphenol alkyl ($C_{12}$–$C_{15}$) phosphites, 4,4'-butylidenebis(3-methyl-6-t-butylphenyl)ditridecyl phosphite, bis (2,4-di-t-butylphenyl) pentaerythritol diphosphite, bis(2,6-di-t-butyl4-methylphenyl) pentaerythritol diphosphite, bis (nonylphenyl)pentaerythritol diphosphite, distearylpentaerythritol diphosphite, phenyl-bisphenol A pentaerythritol diphosphite, tetraphenyldipropylene glycol diphosphite, 1,1,3-tris (2-methyl4-di-tridecylphosphite-5-t-butylphenyl)butane and 3,4,5,6-dibenzo-1,2-oxaphosphan-2-oxide, and the like. Available commercial products include Adekastab PEP-36, PEP-24, PEP-4C and PEP-8 (all trademarks, manufactured by Asahi Denka Kogyo K.K.), Irgafos 168 (trademark, manufactured by Ciba Specialty Chemicals.), Sandostab P-EPQ (trademark, manufactured by Clariant), Chelex L (trademark, manufactured by Sakai Kagaku Kogyo K.K.), 3P2S (trademark, manufactured by Ihara Chemical Kogyo K.K.), Mark 329K and Mark P (both trademarks, manufactured by Asahi Denka Kogyo K.K.) and Weston 618 (trademark, manufactured by Sanko Kagaku K.K.).

Examples of hindered phenol type oxidation inhibitors include n-octadecyl-3-(3',5'-di-t-butyl4-hydroxyphenyl) propionate, 2,6-di-t-butyl4-hydroxymethylphenol, 2,2'-methylenebis (4-methyl-6-t-butylphenol) and pentaerythritoltetrakis[3-(3,5-di-t-butyl4-hydroxyphenyl)propionate, and the like.

Examples of epoxy type stabilizers include epoxidized soybean oil, epoxidized linseed oil, phenylglycidyl ether, allylglycidyl ether and 3,4-epoxycyclohexylmethyl-3',4'-epoxycyclohexane carboxylate, and the like.

Other customary additives may be added to all of the resin compositions at the time of mixing or molding of the resin in amounts as necessary which do not have any deleterious effect on physical properties. For example, coloring agents (pigments or dyes), reinforcing agents (glass fibers, carbon fibers, etc.), fillers (carbon black, silica, titanium oxide, etc.), heat-resistant agents, oxidation inhibitors, weather-proofing agents, lubricants, mold release agents, plasticizer, flame retarding agents and fluidity enhancing agents, etc., may be added. Furthermore, dyes may be added in order to ameliorate yellowness in the blue direction.

As to the method of preparing the present compositions conventional techniques using standard equipment can be used without any particular limitation, e.g. melt mixing optionally using small amounts of solvents. The components of the composition can be mixed in any order. Extruders, Banbury mixers, rollers and kneaders etc. operated batchwise or continuously are examples of suitable apparatus.

The compositions may be converted to articles using common thermoplastic processes such as film and sheet extrusion, injection molding, gas-assist ed injection molding, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional fimctionalities to the articles.

Accordingly, another embodiment relates to articles, sheets and films prepared from the compositions above. Preferred applications of the thermoplastic compositions include, for example, single or multi-layer sheet or film products, household articles, automotive applications, ophthalmic lens applications, automotive lighting and the like.

Also provided herein are compositions comprising thermoplastic polymers and a polymeric anti-static salt wherein articles prepared from the compositions exhibit fog resistant characteristics in addition to anti-static characteristics. Not wishing to be bound by theory, but it is believed that the presence of the polymeric anti-static agent at the surface of an article provides a reduction in surface tension of water that may be present. The surface tension is reduced sufficiently to prevent the formation of water droplets. Instead a film of water results and the formation of fog is prevented at the article surface.

All cited patents, patent applications, and other references are incorporated herein by reference in their entirety. The invention is further illustrated by the following non-limiting examples.

EXAMPLES

Preparation of the polymeric anti-static salt poly(methacrylic acid) tetrabutylphosphonium salt (TBP-5):

A 50 milliliter (ml) amount of poly(methacrylic acid), sodium salt (30 wt % solution in water from Aldrich, Mn=6,500 gram/mol) is diluted by adding 50 ml water. To this solution, 47.1 grams of tetrabutylphosphonium bromide dissolved in 250 ml water is gradually added while stirring. The mixture is stirred for a few minutes for the reaction to occur. At this point poly(methacrylic acid) tetrabutylphosphonium salt (TBP-5) is formed having the structure (XII). The TBP-5 is extracted with 300 ml chloroform and washed three times with 250 ml water in a separatory finnel. The chloroform layer and the water layer are separated and the chloroform is removed by rotary evaporation ($T_{begin}$=40° C., $T_{end}$=90° C., $p_{begin}$=475 mbar, $p_{end}$=100 mbar) until the TBP-5 is dried. The product is completely dried for at least 12 hours in a vacuum drying oven (T=50° C.).

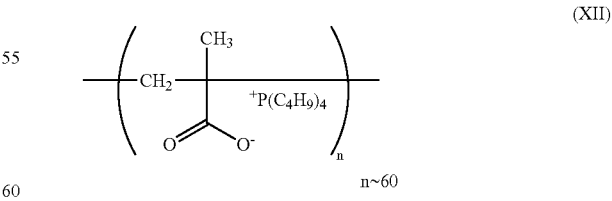

(XII)

Preparation of Blends of TBP-5 and Polycarbonate:

Several compositions containing TBP-5 and polycarbonate are prepared according to Table 1. The blends were prepared by compounding the polymeric salt at 260° C. with polycarbonate PC175 available from GE Plastics. Polycarbonate stabilizers Irgafos 168 from Ciba Specialty Chemicals (0.036 weight %) and Irganox 1076 from Ciba Specialty Chemicals (0.02 weight %) were added to each of the formulations. Example 4 further contained a tetrabutylphosphonium arylsulfonate EPA-202 available from Takemoto Oil and Fat Co., Ltd.

Plaques of each formulation were injection molded at 260° C. using injection speeds of 15 and 35 seconds. Plaques used for the static decay and dust tests were wrapped in aluminum foil to protect the surface.

Static decay half time values were measured on flat-plate injection-molded samples of 70×60×2.55 millimeter (mm) using a Honestometer type S5109 (Shishido Electrostatic Ltd.). The charging potential was −10 kilovolts (kV). Results are represented as the static decay half time value ($t_{1/2}$ in seconds), i.e. the time in which half of the acquired charge is dissipated. After the static decay time is measured for the as-molded samples, the plaques were then washed with running deionized (DI) water for 15 seconds per side and then allowed to dry for one day at 23° C. and 50% relative humidity. Static decay times for the washed samples were measured as described.above.

Dust test: A standard desiccator is employed as a dust chamber wherein an artificial dust of $NH_4Cl$ is produced by combining the fumes of 25% ammonia solution ($NH_3$ aq) and 37% hydrogen chloride (HCl). The samples are inserted in the dust chamber for one hour and then evaluated visually. Samples are rated on a scale of ten with a high level of dust attraction given a mark of 1 (poor) while samples with no dust attraction receive a 10 (good). Both the amount of dust condensed on the plaque as well as the pattern of dust gathered is part of this rating.

TABLE 1

Anti-dust properties of TBP-5 and PC175 blends.

| Example | Weight % TBP-5 | $t_{1/2}$ (s) as-molded | $t_{1/2}$ (s) after washing | [a]Dust test as-molded | [a]Dust test after washing |
|---|---|---|---|---|---|
| 1 | 0 | infinite | infinite | 1 | 1 |
| 2 | 0.6 | infinite | infinite | 3 | 9 |
| 3 | 0.6 | 1150 | infinite | 1 | 3[b] |
| 4 | 0.6 (1.8% EPA-202) | 19.5 | infinite | 10 | 3[b] |
| 5 | 2 | 13.5 | 401 | 10 | 10 |

[a]Dust test scores range from 10 (excellent anti-dust performance for entire plaque) to 1 (poor)
[b]Some areas are dust free As the results in Table 1 illustrate, addition of TBP-5 to polycarbonate improves the anti-static and anti-dust performance of the washed blends. While the data for the washed 0.6 weight % TBP-5 (Examples 2 and 3) show dust attraction on regions of the molded plaques, there are areas where the surface is dust-free. However, increasing the TBP-5 concentration to 2 weight % (Example 5) results in excellent dust test performance across the entire surface of the molded plaque for both the as-molded and washed samples. Addition of non-polymeric anti-static salt EPA-202 did improve the dust test performance on the as-molded samples (Example 4), but the washed samples performed no better than the blends with equivalent amounts of TBP-5, but no EPA-202. Such a result illustrates that the EPA-202 does not provide retention of anti-static properties after washing which is provided by the polymeric anti-static salt.

In addition to the excellent water resistant anti-dust properties of these blends, the optical properties are also good as shown in Table 2. The yellowness index (YI) of 3.2 millimeter thick samples of Examples 1–5 was obtained according to ASTM D1925. The percent (%) of light transmission and haze values of the compositions were obtained according to ASTM D1003.

TABLE 2

Optical properties of TBP-5 and PC175 blends (3.2 mm).

| Example | Weight % TBP-5 | % Transmission | YI | Haze |
|---|---|---|---|---|
| 1 | 0 | 90.7 | 1.5 | 0.2 |
| 2 | 0.6 | 88.6 | 7.1 | 1.1 |
| 3 | 0.6 | 89.6 | 4.8 | 0.3 |
| 4 | 0.6 (1.8% EPA-202) | 90.1 | 4.5 | 0.1 |
| 5 | 2 | 89.5 | 5.8 | 0.3 |

Although the blends containing TBP-5 do show a slight increase in YI, the % transmission remains high. It was unexpectedly discovered that the addition of a polymeric anti-static agent to a transparent material would provide excellent light transmission properties as well as good haze results, while at the same time providing excellent permanent anti-static properties.

Preparation of Poly(meth)acrylate, Containing Pendent Tetrabutylphosphonium Sulfonate Groups (PMA-TBPS):

Synthesis of 4-(6-hydroxy hexyl)oxy Benzene Tetrabutylphosphonium Sulfonate:

Into a three-necked round-bottom flask equipped with a magnetic stirring bar and a reflux condenser were added 4-hydroxybenzenesulfonicacid sodium salt (30.0 grams (g), 0.13 mol), potassium hydroxide (9.0 g, 0.16 mol) and distilled water (60 milliliter (ml)). 1-Bromohexanol (23.16 g, 0.13 mol) dissolved in ethanol (50 ml) was added drop wise into the reaction mixture at room temperature. The reaction mixture was refluxed for 24 hours and then cooled to room temperature. The precipitated product was filtered and washed with chloroform to remove excess of 1-bromohexanol. The product was dried under vacuum at 70° C. for 12 hours to provide 38.06 g of sodium 4-(6-hydroxyhexyl) oxybenzenesulfonate (92% yield).

The dried salt (21.0 g) was dissolved in deionized water (200 ml) and passed through an ion exchange column ($^+$H, Tulsion) to obtain 4-(6-hydroxy hexyl)oxy benzene sulfonic acid. An aqueous solution of 4-(6-hydroxy hexyl)oxy benzene sulfonic acid was neutralized with tetrabutylphosphonium hydroxide (TBPH) up to pH 7. The resulting aqueous solution was extracted with chloroform (3×100 ml); the combined organic layer was washed with water, separated, and dried over anhydrous sodium sulfate. The organic solution was filtered and the solvent was removed on a rotary evaporator to provide a colorless viscous 4-(6-hydroxy hexyl) oxy benzene tetrabutylphosphonium sulfonate. The product was dried under vacuum at 60° C. for 12 h; the yield was 35 g (94%).

Synthesis of 4-(6-methacryloxy hexyl)oxy Benzene Tetrabutylphosphonium Sulfonate:

Into a 250 ml three-necked round bottom flask equipped with a magnetic stirring bar, a nitrogen inlet tube, and a dropping funnel were placed 4-(6-hydroxy hexyl)oxy benzene tetrabutylphosphonium sulfonate (20.0 g, 0.038 mol), dry chloroform (50 ml), triethylamine (5.82 g, 0.058 mol) and a catalytic amount of 2,6-ditert-butyl-p-cresol. The reaction mixture was cooled to 5° C. with ice salt mixture and to it was added methacryloyl chloride (5.51 g, 0.058 mol) in dry chloroform (50 ml) drop wise over a period of 30 minutes. The reaction mixture was allowed to attain room temperature and further stirred for 24 h. The excess methacryloyl chloride and solvent were removed under reduced pressure to provide a residue. The residue was extracted with ethyl acetate (100 ml) and the ethyl acetate solution was stirred with 5% aqueous solution of sodium bicarbonate (100 ml) for 2 h. The ethyl acetate layer was separated and washed with distilled water (2×50 ml), dried over sodium sulfate, filtered and the solvent was removed on a rotary evaporator to provide 18 g of a viscous oily product of 4-(6-methacryloxy hexyl)oxy benzene tetrabutylphosphonium sulfonate (75% yield).

Synthesis of Poly(meth)acrylate Containing Pendent Tetrabutylphosphonium Sulfonate Groups (PMA-TBPS):

Into a 250 ml three-necked round bottom flask equipped with a magnetic stirring bar and a nitrogen inlet tube were placed 4-(6-methacryloxy hexyl)oxy benzene tetrabutylphosphonium sulfonate (22.0 g, 0.037 mol), dry 1,4-dioxane (90 ml), and benzoyl peroxide (1.1 g, 5 wt %). The reaction mixture was heated at 90° C. for 24 h. The solvent was removed under reduced pressure and the viscous product obtained was dissolved in acetone (50 ml) and precipitated into toluene (500 ml). Toluene was decanted and the obtained polymer was dried at 60° C. for 24 h under reduced pressure to provide poly(meth)acrylate containing pendent tetrabutylphosphonium sulfonate groups.

Preparation of Blends of PMA-TBPS and Polycarbonate:

The antistatic performance of poly(meth)acrylate containing pendent tetrabutylphosphonium sulfonate groups was evaluated by blending it with polycarbonate (PC145 available from GE Plastics) at loadings of 2 and 5 weight percent based on the total amount of polycarbonate and the poly (meth)acrylate. The blends included the following additives: Tinuvin 234 (0.27 weight percent), Irgaphos 168 (0.16 weight percent), Irganox 1076 (0.04 weight percent), and for Examples 6–7 pentaerythritol tetrastearate (PETS; 0.3 weight percent). The polycarbonate, salt, and additives were mixed in a mixer-grinder for about a minute. The mixed sample was dried at 80° C. for at least 12 hours in an oven prior to preparation of test samples. The dried material was then compounded and injection molded in a twin-screw micro-compounder and micro-injection molder (DACA Instruments) according to the following conditions: compounder barrel temperature of 280–285° C., screw speed at 100 rpm, temperature of the transfer pot at 275–280° C., and a mold temperature of 90° C. The resulting injection molded test specimens had a dimension of 50 mm×35mm×2mm.

Static decay half time values were measured on test specimens according to the procedure above for blends of TBP-5 and polycarbonate. The results of the static decay test and a visual inspection of clarity are illustrated in Table 3.

TABLE 3

Anti-static performance of poly(meth)acrylate containing pendent tetrabutylphosphonium sulfonate groups in polycarbonate

| Example | Weight % PMA-TBPS | $t_{1/2}$ (s) as-molded | $t_{1/2}$ (s) after washing | Visual |
|---|---|---|---|---|
| 6 | 2 | infinite | No decay[b] | Translucent |
| 7 | 5 | 27.20 | 24.14[c] | Opaque |
| 8[a] | 5 | 17.53 | 17.31[c] | Opaque |

[a]Does not contain PETS
[b]After washing for 60 seconds under running water
[c]After washing for 10 seconds under running water As the results in Table 3 illustrate, the addition of the poly(meth)acrylate having pendent tetrabutylphosphonium sulfonate groups to polycarbonate provides excellent retention of anti-static properties even after exposure to running water.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition, comprising:
    a thermoplastic polymer; and
    a polymeric anti-static salt, wherein the polymeric anti-static salt comprises a polymeric anionic component and a cationic component, wherein the polymeric anionic component is derived from polyacrylic acid, poly(alkyl)acrylic acid, poly(maleic acid), poly(vinyl sulfonic acid), polyacrylate, or poly(alkyl)acrylate.

2. The composition of claim 1, wherein the thermoplastic polymer is aromatic thermoplastic polymer, polycarbonate, aromatic polycarbonate, (co)polyestercarbonate, aromatic (co)polyestercarbonate, polyester, polyphenylene ether, polyphenylene ether/styrene blend, polyamide, polyketone, acrylonitrile-butadiene-styrene copolymer, blends thereof, or a combination comprising at least one of the foregoing polymers.

3. The composition of claim 1, wherein the polyacrylate or poly(alkyl)acrylate comprise carboxylate or sulfonate groups.

4. The composition of claim 1, wherein the polymeric anionic component derived from polyacrylic acid, poly (alkyl)acrylic acid, poly(maleic acid), polyacrylate or poly (alkyl)acrylate comprises substitution on the polymer backbone, wherein the substitution is linear, branched, or cyclic $C_1$–$C_{10}$ alkyl group, $C_6$–$C_{12}$ aryl group, ($C_1$–$C_{10}$ alkyl) $C_6$–$C_{12}$ aryl group, ($C_6$–$C_{12}$ aryl)$C_1$–$C_{10}$ alkyl group, or a combination of the foregoing groups, wherein the alkyl and aryl groups are substituted with 0, 1, 2, or 3 substitutents independently chosen from hydroxyl, halogen, $C_1$–$C_6$ alkyl, $C_1$–$C_6$ haloalkyl, and $C_1$–$C_6$ alkoxy.

5. A composition, comprising:
    a polycarbonate, an aromatic polycarbonate, a (co)polyestercarbonate, an aromatic (co)polyestercarbonate, blends thereof, or a combination comprising at least one of the foregoing polymers; and about 0.1 to about 10 weight percent of a polymeric anti-static salt based on the total weight of the composition,
    wherein the polymeric anti-static salt comprises a polymeric anionic component derived from poly(meth)acrylic acid, polyacrylie acid, poly(ethy)acrylic acid, poly(maleic acid), poly(vinyl sulfonic acid), poly (meth)acrylate comprising sulfonic acid groups, or polyacrylate comprising sulfonic acid groups;
    and a phosphonium or ammonium cationic component; or
    wherein the polymeric anti-static salt is the reaction product of ionic monomer, wherein the ionic monomer comprises a reactive functionality and a salt moiety.

6. The composition of claim 5, wherein the salt moiety is a carboxylate salt or a sulfonate salt comprising a phosphonium or ammonium cationic component according to the following structure:

wherein Q is nitrogen or phosphorus; and $R^1$, $R^2$, $R^3$, and $R^4$ are each independently a $C_1$–$C_{20}$ alkyl, a ($C_6$–$C_{12}$ aryl)$C_1$–$C_{10}$ alkyl group, a ($C_1$–$C_{10}$ alkyl)$C_6$–$C_{12}$ aryl group, or a $C_6$–$C_{12}$ aryl group.

7. The composition of claim 5, wherein the ionic monomer further comprises a linking group linking the reactive functionality and the salt moiety; wherein the linking group comprises ethylene glycol units, divalent ($C_1$–$C_{20}$) alkyl, divalent ($C_6$–$C_{12}$) aryl, divalent ($C_1$–$C_{10}$ alkyl)$C_6$–$C_{12}$ aryl, divalent ($C_6$–$C_{12}$ aryl)$C_1$–$C_{10}$ alkyl, divalent ($C_1$–$C_{10}$ alkoxy)$C_6$–$C_{12}$ aryl, or divalent ($C_6$–$C_{12}$ aryloxy)$C_1$–$C_{10}$ alkyl.

8. The composition of claim 1, wherein the polymeric anti-static salt comprises a phosphonium or ammonium cationic component.

9. The composition of claim 8, wherein the phosphonium or ammonium cationic component comprises a compound according to the following structure:

wherein Q is nitrogen or phosphorus; and $R^1$, $R^2$, $R^3$, and $R^4$ are each independently a $C_1$–$C_{20}$ alkyl, a ($C_6$–$C_{12}$ aryl)$C_1$–$C_{10}$ akyl group, a ($C_1$–$C_{10}$ alkyl)$C_6$–$C_{12}$ aryl group, or a $C_6$–$C_{12}$ aryl group.

10. The composition of claim 9, wherein the phosphonium cationic component is tetramethyl phosphonium, tetracthyl phosphonium, tetrapropyl phosphonium, tetrabutyl phosphonium, triethylmethyl phosphonium, tributylmethyl phosphonium, tributylethyl phosphonium, trioclylmethyl phosphonium, trimethylbutyl phosphonium, trimethyloctyl phosphonium, trimethyllauryl phosphonium, trimethylstcaryl phosphonium, triethyloctyl phosphonium, tetraphenyl phosphonium, triphenylmethyl phosphonium, triphenylbenzyl phosphonium, tributylbenzyl phosphonium, or combinations comprising at least one of the foregoing phosphonium cation components.

11. The composition of claim 9, wherein the ammonium cationic component is tetramethyl ammonium, tetraethyl ammonium, tetrapropyl ammonium, tetrabutyl ammonium, triethylmethyl ammonium, tributylmethyl ammonium, tributylethyl ammonium, trioclylmethyl ammonium, trimethylbutyl ammonium, trimethyloctyl ammonium, trimethyllauryl ammonium, trimethylstearyl ammonium, triethyloctyl ammonium, tetraphenyl ammonium, triphenylmethyl ammonium, triphenylbenzyl ammonium, tributylbenzyl ammonium, or combinations comprising at least one of the foregoing ammonium cation components.

12. The composition of claim 1, wherein the amount of polymeric anti-static salt present in the composition is about 0.1 to about 10 weight percent based on the total weight of the composition.

13. An article prepared from lthe composition of claim 1.

14. A method of making a transparent, anti-static article, comprising:
blending a thermoplastic polymer and a polymeric anti-static salt to form a blend; and
molding the blend to form an article,
wherein the polymeric anti-static salt comprises a polymeric anionic component and a cationic component, wherein the polymeric anionic component is dericed from polyacylic acid, poly(alkyl)acrylic acid, poly(maleic acid), poly(vinyl sulfonic acid), polyacrylate, or poly(alkyl)acrylate.

15. A method of preparing a polymeric anti-static salt, comprising:
polymerizing ionic monomers to form a polymeric anti-static salt, wherein the ionic monomer comprises reactive functionality and a salt moiety,
wherein the reactive functionality is an epoxy group, an acrylate group, an (alkyl)acrylate group, an allylic group, an acrylamide group, an (alkyl)acrylamide group, a crotyl group or a combination comprising at least one of the foregoing groups; and
wherein the salt moiety is a carboxylate salt or a sulfonate salt comprising a phosphonium or ammonium cationic component according to the structure:

wherein Q is nitrogen or phosphrus; and $R^1$, $R^2$, $R^3$, and $R^4$ are each independently a $C_1$–$C_{20}$ alkyl, a ($C_6$–$C_{12}$ aryl)$C_1$–$C_{10}$ alkyl group, a ($C_1$–$C_{10}$ alkyl)$C_6$–$C_{12}$ aryl group, or a $C_6$–$C_{12}$ group, and
wherein the polymeric anti-static salt comprises a polymeric anionic component and a cationic component.

16. A polymeric anti-static salt prepared by the method of claim 15.

17. A polymeric anti-static salt, comprising repeating untis according to the structure:

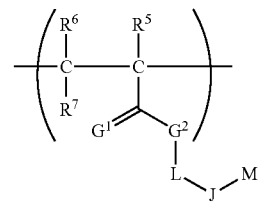

wherein $R^5$ is H or ($C_1$–$C_6$)alkyl; $R^6$ is H or ($C_1$–$C_6$)alkyl; $R^7$ is H or ($C_1$–$C_6$)alkyl; $G^1$ is O or S; $G^2$ is O, S or $NR^8$, wherein $R^8$ is H or ($C_1$–$C_6$)alkyl; L is one or more units of ethylene glycol, divalent ($C_1$–$C_{20}$) alkyl, divalent ($C_6$–$C_{12}$) aryl, divalent ($C_1$–$C_{20}$ alkoxy) $C_1$–$C_{20}$ alkyl, divalent ($C_1$–$C_{10}$ alkyl)$C_6$–$C_{12}$ aryl, or divalent ($C_6$–$C_{12}$ aryl)$C_1$–$C_{10}$ alkyl, divalent ($C_1$–$C_{10}$ alkoxy)$C_6$–$C_{12}$ aryl, or divalent ($C_6$–$C_{12}$ aryloxy)$C_1$–$C_{10}$ alkyl; J is a carboxylate or a sulfonate group; and M is an ammonium or phosphonium cationic component according to the structure:

wherein Q is nitrogen or phosphorus; and $R^1$, $R^2$, $R^3$, and $R^4$ are each independently a $C_1$–$C_{20}$ alkyl, a ($C_6$–$C_{12}$ aryl)$C_1$–$C_{10}$ alkyl group, a ($C_1$–$C_{10}$ alkyl)$C_6$–$C_{12}$ aryl group, or a $C_6$–$C_{12}$ aryl group.

18. The polymeric anti-static salt of claim 17, wherein $R^5$ is H or methyl, $R^6$ and $R^7$ are H, $G^1$ and $G^2$ are O; L is a divalent ($C_1$–$C_{10}$ alkoxy)$C_6$–$C_{12}$ aryl; J is a sulfonate group; and M is a phosphonium cationic component.

19. A composition, comprising:

a thermoplastic polymer; and the polymeric anti-static salt of claim 16.

* * * * *